(12) United States Patent
Jeon

(10) Patent No.: US 11,654,782 B2
(45) Date of Patent: May 23, 2023

(54) BATTERY MODULE

(71) Applicant: Samsung SDI Co., Ltd., Yongin-si (KR)

(72) Inventor: Doosung Jeon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 247 days.

(21) Appl. No.: 16/318,964

(22) PCT Filed: Jul. 17, 2017

(86) PCT No.: PCT/KR2017/007639
§ 371 (c)(1),
(2) Date: Jan. 18, 2019

(87) PCT Pub. No.: WO2018/016815
PCT Pub. Date: Jan. 25, 2018

(65) Prior Publication Data
US 2019/0305282 A1     Oct. 3, 2019

(30) Foreign Application Priority Data

Jul. 21, 2016   (KR) ........................ 10-2016-0092884

(51) Int. Cl.
*B60L 50/64* (2019.01)
*H01M 50/24* (2021.01)
(Continued)

(52) U.S. Cl.
CPC ........... *B60L 50/64* (2019.02); *H01M 50/204* (2021.01); *H01M 50/24* (2021.01); *H01M 50/50* (2021.01);
(Continued)

(58) Field of Classification Search
CPC ...... H01M 2/206; H01M 2/10; H01M 2/1077; H01M 2/1083; H01M 2/1094; H01M 2/20;
(Continued)

(56) References Cited

U.S. PATENT DOCUMENTS 5,804,770 A    9/1998  Tanaka
8,338,710 B2 * 12/2012  Maguire ................ H02G 15/02
                                                        174/135

(Continued)

FOREIGN PATENT DOCUMENTS

CN            1054706 C       7/2000
CN          102257654 A      11/2011
(Continued)

OTHER PUBLICATIONS

International Search Report for corresponding International Application No. PCT/KR2017/007639, dated Oct. 23, 2017, 5pp.

(Continued)

*Primary Examiner* — Helen Oi K Conley
(74) *Attorney, Agent, or Firm* — Lewis Roca Rothgerber Christie LLP

(57) ABSTRACT

Provided is a battery module. The battery module includes: a plurality of battery packs; a bus bar electrically connecting neighboring battery packs to each other; and a bus bar cover covering an end portion of the bus bar for insulating the bus bar, the bus bar cover including a hollow portion through which a coupling hole of the bus bar is exposed, the hollow portion extending in a direction away from the bus bar. According to embodiments, in the battery module, the bus bar electrically connecting different battery packs is sufficiently insulated to prevent malfunctions and safety accidents caused by a short circuit of the bus bar through which charging and discharging high-voltage current flows.

17 Claims, 6 Drawing Sheets

(51) Int. Cl.
H01M 50/50 (2021.01)
H01M 50/204 (2021.01)
H01M 50/503 (2021.01)

(52) U.S. Cl.
CPC ...... *H01M 50/503* (2021.01); *H01M 2200/00* (2013.01); *H01M 2220/20* (2013.01)

(58) Field of Classification Search
CPC .... H01M 50/502; H01M 50/20; H01M 50/24; H01M 50/50; H01M 2200/00; H01M 2220/20; H01M 50/204; H01M 50/503; H01M 2220/10; B60L 50/64; H01R 2201/26; H01R 11/288; Y02E 60/10; Y02T 10/70
See application file for complete search history.

(56) References Cited

U.S. PATENT DOCUMENTS

| | | | |
|---|---|---|---|
| 8,709,628 | B2 | 4/2014 | Carignan et al. |
| 8,936,865 | B2 | 1/2015 | Kim |
| 9,005,800 | B2 | 4/2015 | Park et al. |
| 9,017,857 | B2 | 4/2015 | Lee et al. |
| 9,054,359 | B2 | 6/2015 | Han et al. |
| 9,172,068 | B2 | 10/2015 | Kim |
| 9,318,752 | B2 | 4/2016 | Kim et al. |
| 9,508,464 | B2 | 11/2016 | Nakayama |
| 9,548,484 | B2 | 1/2017 | Tanaka et al. |
| 9,608,298 | B2 | 3/2017 | Jeong et al. |
| 2011/0223466 | A1* | 9/2011 | Lee ................ H01M 50/20 429/158 |
| 2013/0137313 | A1 | 5/2013 | Casses et al. |
| 2014/0017533 | A1 | 1/2014 | Nishihara et al. |
| 2014/0111161 | A1 | 4/2014 | Kim |
| 2014/0158396 | A1 | 6/2014 | Nakayama |
| 2015/0086834 | A1 | 3/2015 | Cho |
| 2015/0136438 | A1* | 5/2015 | Lumetta ............. H01M 2/202 174/68.2 |

FOREIGN PATENT DOCUMENTS

| | | |
|---|---|---|
| CN | 104466067 A | 3/2015 |
| CN | 104659628 A | 5/2015 |
| JP | 2855041 B2 | 9/1994 |
| JP | 2521746 Y2 | 10/1996 |
| JP | 9-106802 A | 4/1997 |
| JP | 11-167911 A | 6/1999 |
| JP | 11-167911 A | 6/1999 |
| JP | 2012-38558 A | 2/2012 |
| JP | 2012-138333 A | 7/2012 |
| JP | 2013-37988 A | 2/2013 |
| JP | 2013-62103 A | 4/2013 |
| JP | 2013-168387 A | 8/2013 |
| JP | 2013-533586 A | 8/2013 |
| JP | 2013-536974 A | 9/2013 |
| JP | 2014-160679 A | 9/2014 |
| JP | 2014-165102 A | 9/2014 |
| JP | 2015-106531 A | 6/2015 |
| JP | 2015-149213 A | 8/2015 |
| KR | 10-2010-0070170 A | 6/2010 |
| KR | 10-2011-0044129 A | 4/2011 |
| KR | 10-2011-0044130 A | 4/2011 |
| KR | 10-1084213 B1 | 11/2011 |
| KR | 10-1087036 | 11/2011 |
| KR | 10-2012-0050112 A | 5/2012 |
| KR | 10-2014-0052519 A | 5/2014 |
| KR | 10-1405808 B1 | 6/2014 |

OTHER PUBLICATIONS

Written Opinion for corresponding International Application No. PCT/KR2017/007639, dated Oct. 23, 2017, 5pp.
Korean Office Action dated Jun. 9, 2020, for corresponding Korean Patent Application No. 10-2016-0092884 (4 pages).
EPO Extended Search Report dated Feb. 12, 2020, for corresponding European Patent Application No. 17831288.0, 7 pages.
Chinese Office Action, corresponding to Application No. 201780045126.2, dated Jan. 4, 2021, 7 pages.
English Translation of Chinese Office Action, corresponding to Application No. 201780045126.2, dated Jan. 4, 2021, 11 pages.
International Search Report for corresponding International Application No. PCT/KR2017/007641, dated Nov. 28, 2017, 5pp.
Written Opinion for corresponding International Application No. PCT/KR2017/007641, dated Nov. 28, 2017, 4pp.
Korean Patent Office Action for corresponding Korean Patent Application No. 10-2016-0092886, dated Sep. 11, 2019, 7 pages.
EPO Extended Search Report dated Mar. 4, 2020, for corresponding European Patent Application No. 17831289.8 (7 pages).
Korean Notice of Allowance dated Mar. 10, 2020, for corresponding Korean Patent Application No. 10-2016-0092886 (2 pages).
U.S. Office Action dated Jul. 1, 2020, issued in U.S. Appl. No. 16/319,030 (9 pages).
U.S. Final Office Action dated Oct. 8, 2020, issued in U.S. Appl. No. 16/319,030 (9 pages).
U.S. Advisory Action dated Dec. 15, 2020, issued in U.S. Appl. No. 16/319,030 (2 pages).
Chinese Office action for Application No. 201780045163.3 , dated Jan. 26, 2021, 13 pages.
Chinese Office Action, with English translation, dated Jul. 13, 2021, issued in Chinese Patent Application No. 201780045163.3 (9 pages).
U.S. Notice of Allowance dated May 18, 2022, issued in U.S. Appl. No. 16/319,030 (8 pages).
U.S. Notice of Allowance dated Sep. 13, 2021, issued in U.S. Appl. No. 16/319,030 (8 pages).

* cited by examiner

BATTERY MODULE

CROSS-REFERENCE TO RELATED APPLICATION(S)

This application is a National Phase Patent Application of International Patent Application Number PCT/KR2017/007639, filed on Jul. 17, 2017, which claims priority of Korean Patent Application No. 10-2016-0092884, filed Jul. 21, 2016. The entire contents of both of which are incorporated herein by reference.

TECHNICAL FIELD

The present disclosure relates to a battery module.

BACKGROUND ART

In general, secondary batteries are rechargeable unlike non-rechargeable primary batteries. Secondary batteries are used as energy sources of devices such as mobile devices, electric vehicles, hybrid vehicles, electric bicycles, or uninterruptible power supplies. Secondary batteries are individually used or secondary battery modules each including a plurality of secondary batteries electrically connected as one unit are used according to the types of external devices using secondary batteries.

Small mobile devices such as cellular phones may be operated for a given time using single-cell secondary batteries. However, battery modules having high-output, high-capacity features may be suitable for devices having long operating times and consuming large amounts of power such as electric vehicles and hybrid electric vehicles. The output voltages or currents of battery modules may be increased by adjusting the number of battery cells included in the battery modules.

The background art of the present disclosure is disclosed in Japanese Patent Application Publication 2015-149213.

DESCRIPTION OF EMBODIMENTS

Technical Problem

An embodiment of the present disclosure includes a battery module in which a bus bar electrically connecting different battery packs is sufficiently insulated to prevent malfunctions and safety accidents caused by a short circuit of the bus bar through which charging and discharging high-voltage current flows.

Solution to Problem

According to the present disclosure, a battery module includes: a bus bar electrically connecting different battery packs to each other; and a bus bar cover covering an end portion of the bus bar for insulating the bus bar, the bus bar cover including a hollow portion through which a coupling hole of the bus bar is exposed, the hollow portion extending in a long shape in a direction away from the bus bar.

Advantageous Effects of Disclosure

An embodiment of the present disclosure includes at least two battery packs and a bus bar electrically connecting neighboring battery packs. Since charging and discharging high-voltage current flows in the bus bar, if foreign substances or other parts come into contact with the bus bar, safety accidents may occur and malfunction may occur because of a short circuit of a charging/discharging current path. According to the embodiment of the present disclosure, the bus bar forming the charging/discharging current path is sufficiently insulated to prevent a short circuit with an environmental agent or another internal structure and thus to prevent malfunction of a battery module and unexpected safety accidents.

BEST MODE

Figure 1:
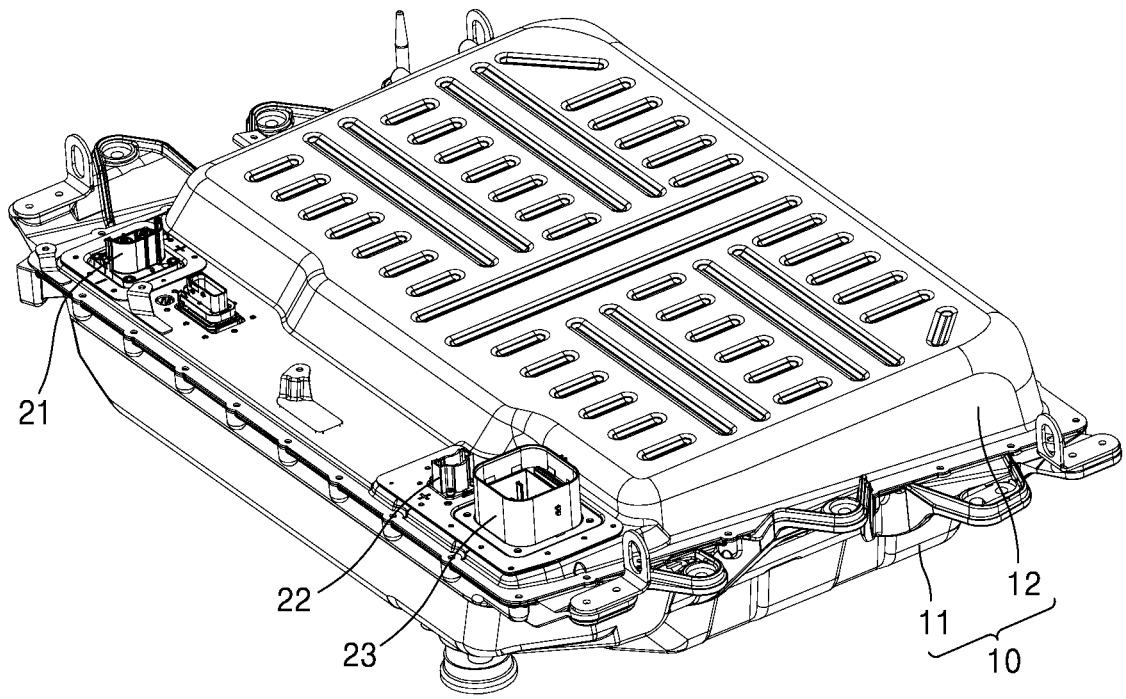
FIG. 1 is a perspective view illustrating a battery module according to an embodiment of the present disclosure.

A battery module of the present disclosure includes a bus bar electrically connecting different battery packs to each other; and a bus bar cover covering an end portion of the bus bar for insulating the bus bar, the bus bar cover including a hollow portion through which a coupling hole of the bus bar is exposed, the hollow portion extending in a long shape in a direction away from the bus bar.

For example, the hollow portion has a cylindrical shape extending in a long shape while surrounding the coupling hole.

For example, the bus bar cover further includes: a cover main body on which the hollow portion is provided; and first and second insulating walls extending from the cover main body to be respectively placed at a side and another side of the bus bar.

For example, the first insulating wall is rotatably connected to the cover main body.

For example, a hinge portion is placed between the first insulating wall and the cover main body to support rotation of the first insulating wall.

For example, a latching protrusion is provided on the first insulating wall to prevent separation of the first insulating wall from the bus bar.

For example, the latching protrusion includes a pair of latching portions provided at both widthwise ends of the first insulating wall.

For example, the second insulating wall is fixed to the cover main body.

For example, the second insulating wall extends from the cover main body in a downward direction opposite the hollow portion.

For example, the first insulating wall is provided at a position relatively far from the hollow portion and covers an outer side of the bus bar, and the second insulating wall is provided at a position relatively close to the hollow portion and covers an inner side of the bus bar.

For example, the bus bar cover includes bus bar covers covering both end portions of the bus bar, and an insulating material is provided on a central portion of the bus bar except for both the end portions of the bus bar.

For example, the bus bar cover further includes an assembly guide for guidance to an assembling position of the bus bar in a length direction of the bus bar.

For example, the assembly guide includes an assembly hole to insert the bus bar into the assembly hole.

For example, the assembly guide further includes an assembly protrusion to fix the assembling position of the bus bar cover with respect to the bus bar.

For example, the assembly protrusion protrudes from a wall defining the assembly hole.

For example, the bus bar cover further includes first and second insulating walls respectively provided at a side and another side of the bus bar, and the second insulating wall protrudes downward from the assembly guide.

For example, the bus bar cover is provided using an insulating material as a one-piece part.

For example, the bus bar cover further includes a barrier wall portion neighboring the hollow portion and surrounding an opening through which a portion of the bus bar is exposed, the barrier wall portion extending in a direction away from the bus bar.

MODE OF DISCLOSURE

Hereinafter, a battery module will be described according to a preferred embodiment of the present disclosure with reference to the accompanying drawings.

Figure 2:
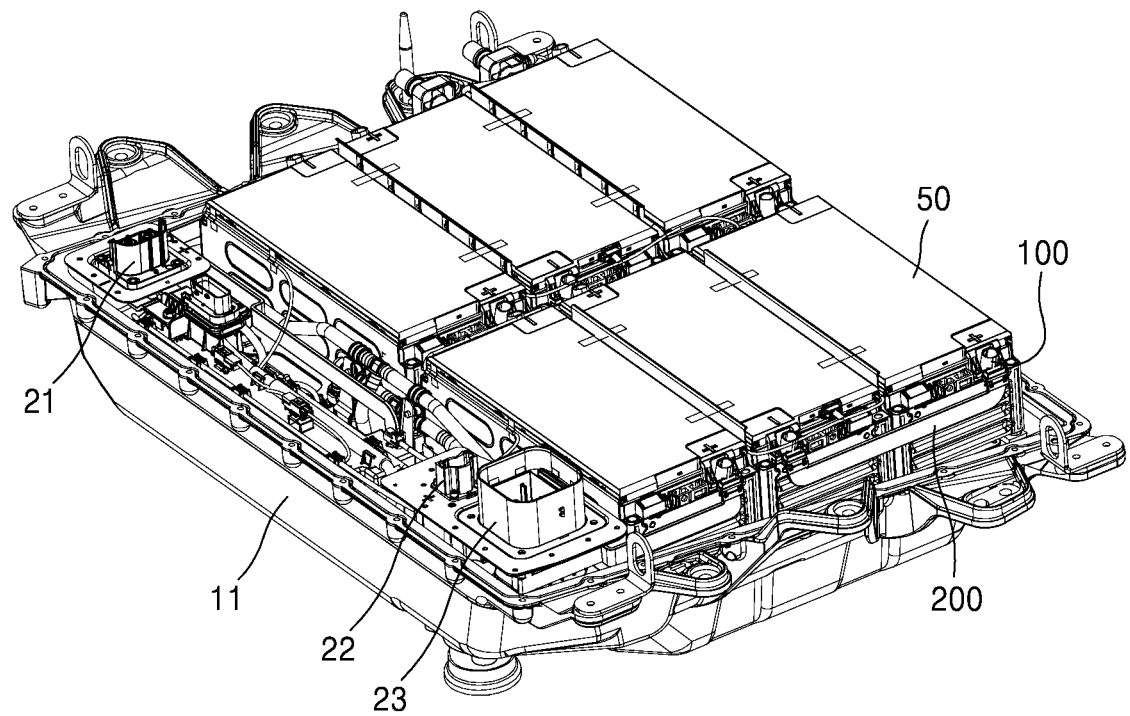
FIG. 2 is a perspective view illustrating the battery module shown in FIG. 1.

FIG. 1 is a perspective view illustrating a battery module according to an embodiment of the present disclosure. FIG. 2 is a perspective view illustrating the battery module shown in FIG. 1.

Referring to the drawings, the battery module may include a battery pack 50 and a housing 10 accommodating the battery pack 50. For example, the housing 10 may include a frame 11 and a cover 12 that are coupled to each other in mutually-facing directions in a state in which a plurality of battery packs 50 are placed between the frame 11 and the cover 12, and the frame 11 is covered with the cover 12. In the embodiment of the present disclosure, the battery pack 50 may include one or more battery packs 50. For example, a plurality of battery packs 50 may be electrically connected in series/parallel, or a combination of series and parallel to provide a required degree of electric power.

The battery module may include a high-voltage connector 21 exposed to the outside of the housing 10. For example, the high-voltage connector 21 may be formed on the frame 11 and protrude from the frame 11 above the cover 12. The battery module may supply driving power to a vehicle, and the high-voltage connector 21 may form an output terminal for supplying driving power.

A circuit unit configured to control charging and discharging operations of the battery packs 50 may be provided on the frame 11, an auxiliary connector 22 through which current is output from the battery packs 50 may be provided on the frame 11, and a fuse block 23 may be provided on the frame 11 to selectively interrupt current of the battery packs 50 when the battery packs 50 malfunction.

The auxiliary connector 22 may be exposed from the cover 12. The battery module may supply driving power to a vehicle, and the auxiliary connector 22 may be used to supply driving power not to the vehicle but to inner electric components of the vehicle. The fuse block 23 may be exposed from the cover 12. In this case, a fuse box (not shown) forming a charge/discharge path for the battery packs 50 may be coupled to an upper portion of the fuse block 23. The fuse box (not shown) may be placed on the charge/discharge path and may interrupt charge/discharge current when malfunction such as overheating or an overcurrent occurs. For example, the fuse box (not shown) may include a variable resistor having temperature-dependent resistance or a fuse capable of blocking the charge/discharge path according to Joule heating. The charge/discharge path may be formed by coupling the fuse box (not shown) to the upper portion of the fuse block 23, and then the battery module may be ready to operate.

The cover 12 may cover the frame 11 on which the high-voltage connector 21, the auxiliary connector 22, and the fuse block 23 are placed. In this case, the cover 12 may include openings to expose the high-voltage connector 21, the auxiliary connector 22, and the fuse block 23.

Figure 3:
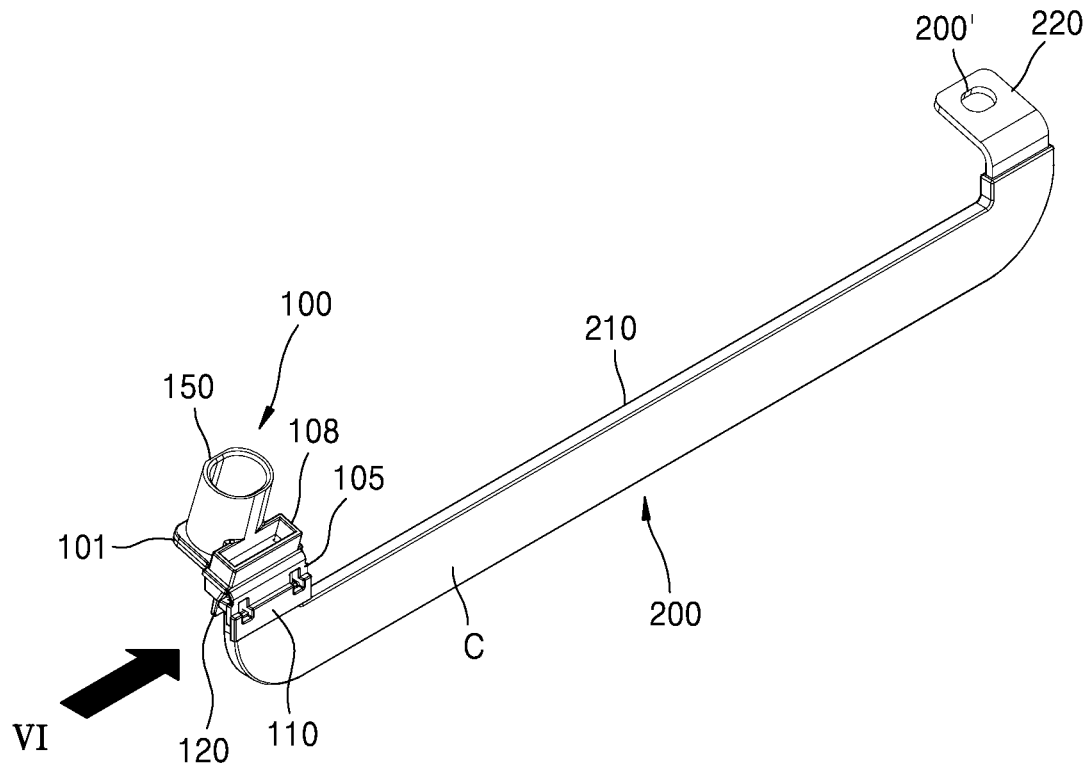
FIGS. 3 and 4 are perspective views illustrating a bus bar and a bus bar cover shown in FIG. 2.
Figure 4:
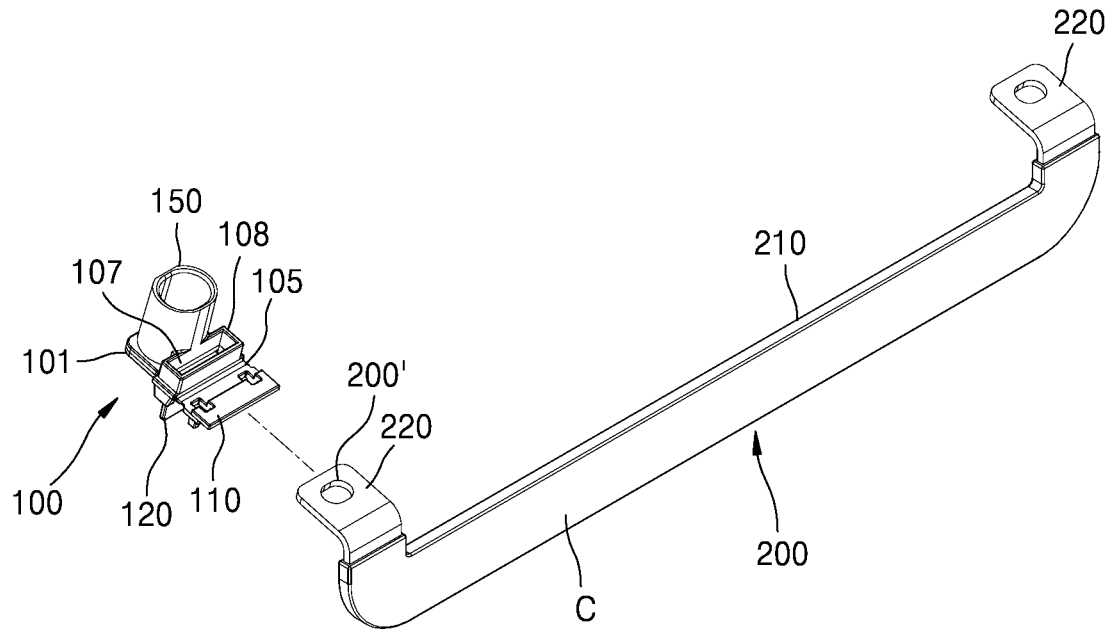
Figure 5:
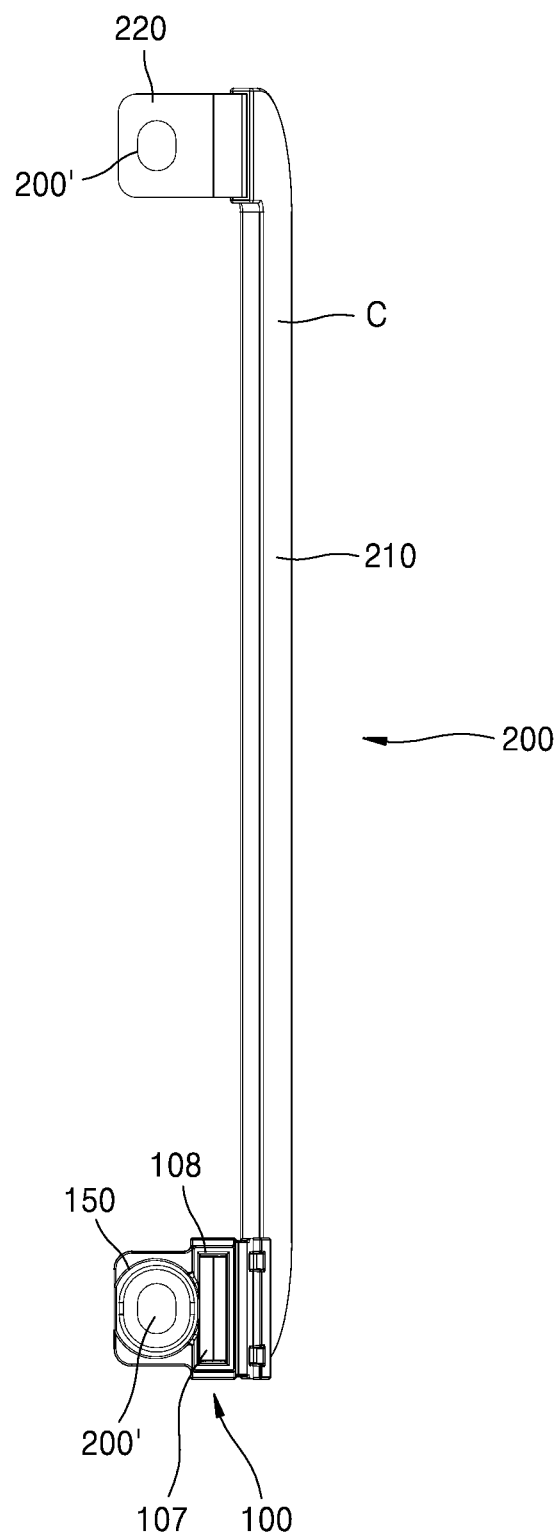
FIG. 5 is a top view illustrating the bus bar and the bus bar cover shown in FIG. 3.
Figure 6:
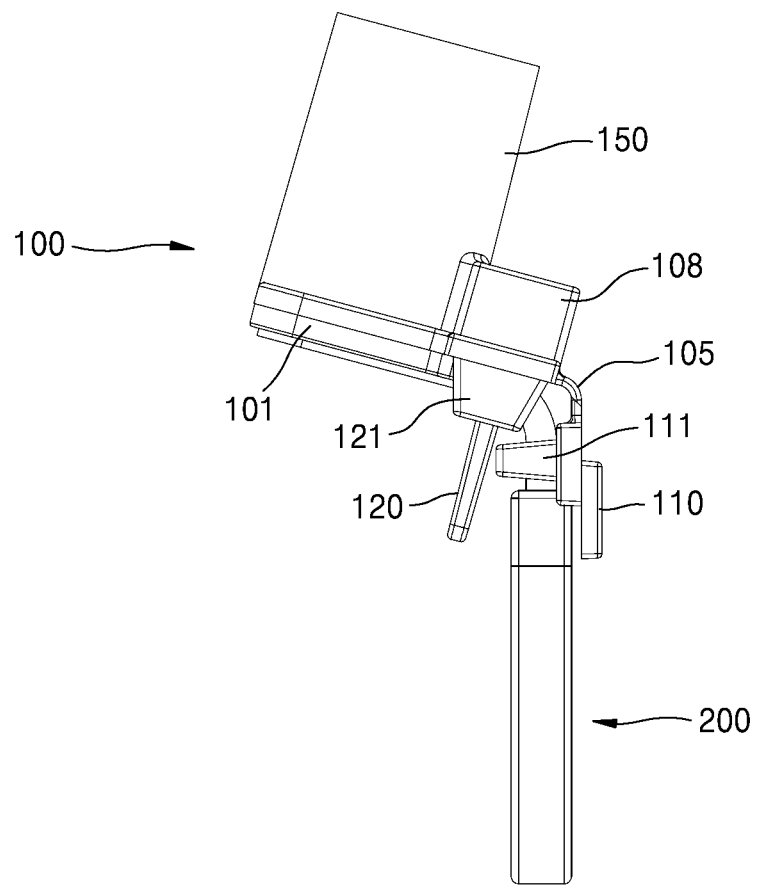
FIG. 6 is a side view illustrating the bus bar cover in a direction VI in FIG. 3.
Figure 7:
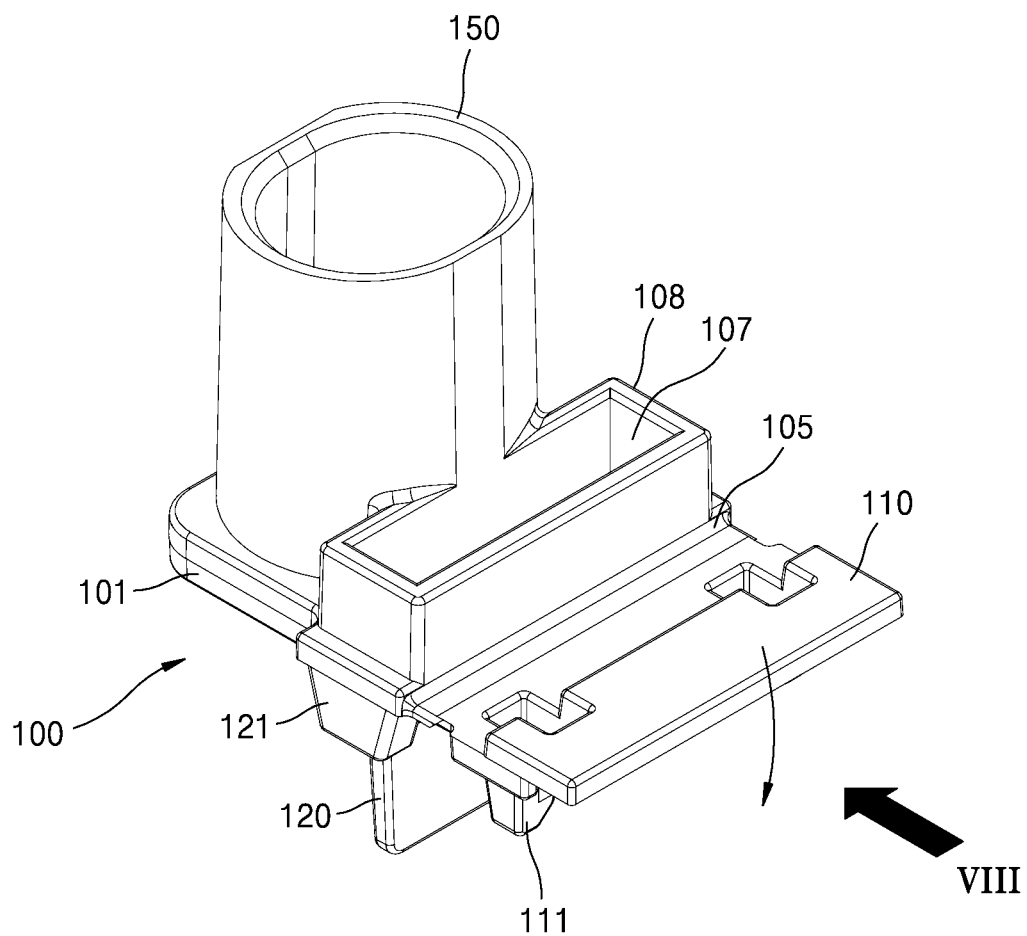
FIG. 7 is a perspective view illustrating the bus bar cover shown in FIG. 3.
Figure 8:
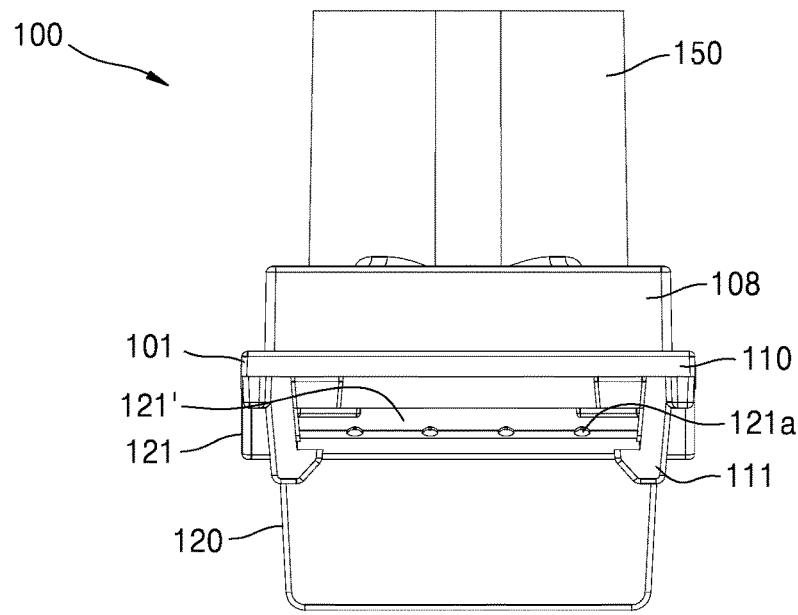
FIG. 8 is a front view illustrating the bus bar cover in a direction VIII in FIG. 7.
Figure 9:
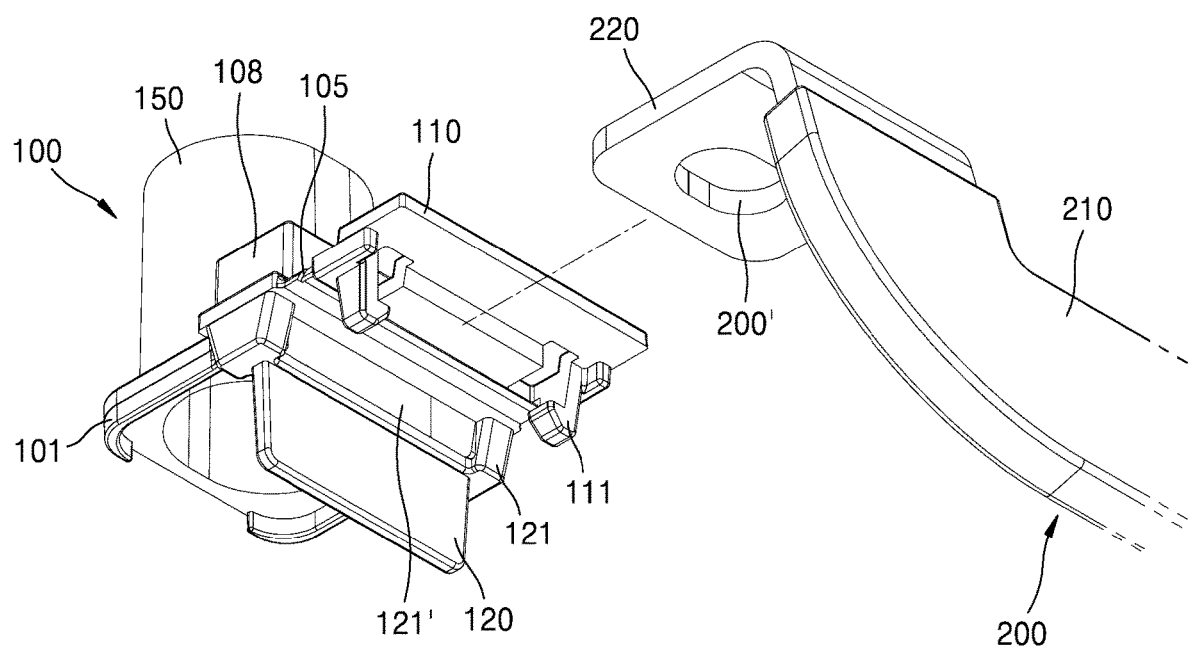
FIG. 9 is a perspective view illustrating coupling between the bus bar and the bus bar cover shown in FIG. 3.

FIGS. 3 and 4 are perspective views illustrating a bus bar and a bus bar cover shown in FIG. 2. FIG. 5 is a top view illustrating the bus bar and the bus bar cover shown in FIG. 3. FIG. 6 is a side view illustrating the bus bar and the bus bar cover in a direction VI in FIG. 3. FIG. 7 is a perspective view illustrating the bus bar cover shown in FIG. 3. FIG. 8 is a front view illustrating the bus bar cover in a direction VIII in FIG. 7. FIG. 9 is a perspective view illustrating coupling between the bus bar and the bus bar cover shown in FIG. 3.

Referring to FIGS. 3 and 4, the bus bar 200 may include a main body 210 extending in one direction and both end portions 220 bent from the main body 210 and extending toward different battery packs 50. Coupling holes 200' may be formed in the bus bar 200 to electrically connect different battery packs 50 to each other. For example, the bus bar 200 may include coupling holes 200' in both the end portions 220, and the coupling holes 200' may be respectively connected to different battery packs 50. The bus bar 200 may electrically connect neighboring battery packs 50 in series, parallel, or a combination of series and parallel to provide a high-voltage, high-capacity battery module for supplying driving power to a vehicle. The bus bar 200 may be fastened to battery packs 50 by fastening members (not shown) inserted through the coupling holes 200' and coupled to terminals of the battery packs 50.

An insulating material C may be formed on the bus bar 200 to insulate the bus bar 200. For example, the insulating material C may be formed on a central portion of the bus bar 200 except for both the end portions 220 by coating the center portion with an insulating substance such as epoxy or polyvinyl chloride (PVC).

For example, the bus bar 200 may include the main body 210 extending in one direction and the end portions 220 bent from the main body 210 and extending respectively toward battery packs 50, and the end portions 220 may include the coupling holes 200'.

An end portion 220 of the bus bar 200 is covered with the bus bar cover 100 to insulate the bus bar 200. The bus bar cover 100 may cover at least one of both the end portions 220 of the bus bar 200. In an embodiment of the present disclosure, bus bar covers 100 may cover both the end portions 220 of the bus bar 200. The bus bar cover 100 covers the end portion 220 of the bus bar 200 and includes a hinge portion 105 such that the bus bar cover 100 may be in tight contact with a bent portion of the bus bar 200 and insulate the bent portion.

The bus bar cover 100 may include a hollow portion 150 which is open toward a coupling hole 200' of the bus bar 200. Since the hollow portion 150 guides a coupling tool (not shown) toward the coupling hole 200', the bus bar 200 may easily be fastened. The hollow portion 150 may extend in a long shape from the coupling hole 200' to a given height to prevent a short circuit caused by exposure of the bus bar 200. The hollow portion 150 extends in a long shape from the coupling hole 200' to a given height to prevent a short circuit caused by exposure of the coupling hole 200' while exposing the coupling hole 200' to the outside. In other words, while the hollow portion 150 exposes the coupling hole 200 'of the bus bar 200, the hollow portion 150 extends in a long shape in a direction away from the bus bar 200 such that although the coupling hole 200' is exposed, a short circuit of the bus bar 200 may be prevented. The hollow portion 150 may isolate the bus bar 200 from environment by a given distance or greater. For example, an external object approaching the coupling hole 200' may be blocked by the hollow portion 150 to prevent the external object from directly making contact with the bus bar 200. That is, the external object may be spaced apart from the bus bar 200 by a given distance.

The hollow portion 150 may be shaped like a hollow cylinder extending in a long shape while surrounding the coupling hole 200'. The hollow portion 150 for surrounding the coupling hole 200' and insulating the periphery of the coupling hole 200' may have a size sufficiently large for exposing the coupling hole 200' and sufficiently small for insulating the periphery of the coupling hole 200'. To this end, the hollow portion 150 may have a hollow cylinder shape surrounding the coupling hole 200' and arranged along the circumference of the coupling hole 200'.

The hollow portion 150 may be formed on a main body 101 of the bus bar cover 100. As described later, the bus bar cover 100 may include the cover main body 101 and a first insulating wall 110 hinged to the cover main body 101. Here, the cover main body 101 may refer to the entirety of the bus bar cover 100 except for the first insulating wall 110 connected through the hinge portion 105.

The insulating material C is formed on most of the bus bar 200 except for both the end portions 220 of the bus bar 200, and bus bar covers 100 may cover the end portions 220. Therefore, the bus bar 200 may be substantially entirely covered with an insulating material or member except for the coupling holes 200' of the bus bar 200, and thus a short circuit of the bus bar 200 may be prevented.

Referring to FIG. 7, an opening 107 for exposing a portion of the bus bar 100 may be formed in a position adjacent to the hollow portion 150, that is, in the cover main body 101 adjacent to the hollow portion 150, and a barrier wall portion 108 surrounding the opening 107 may be formed along the periphery of the opening 107.

The opening 107 is a point for accessing the bus bar 200 to obtain status information such as the temperature or voltage of the bus bar 200. A wire (not shown) for measuring voltage or a thermistor (not shown) may be placed on the bus bar 200 through the opening 107, and such status information obtained through the opening 107 may be used as data for controlling charging and discharging operations. The opening 107 is formed to expose a portion of the bus bar 200, and since a short circuit may be caused due to the exposure of the bus bar 200, the barrier wall portion 108 surrounding the opening 107 and extending in a direction parallel to the hollow portion 150 and away from the bus bar 200 may be formed along the periphery of the opening 107. The barrier wall portion 108 protruding to a given height may prevent conductive substances from approaching the bus bar 200 and may isolate the bus bar 200 from environment by a given distance or greater.

Referring to FIGS. 6 and 7, the bus bar cover 100 may include: the cover main body 101 on which the hollow portion 150 is formed; and first and second insulating walls 110 and 120 extending from the cover main body 101 for being respectively placed at a side and another side of the bus bar 200. The first and second insulating walls 110 and 120 are for preventing electrical interference between the bus bar 200 and structures neighboring the bus bar 200. For example, the first insulating wall 110 may be rotatably hinged to the cover main body 101, and the second insulating wall 120 may be fixed to the cover main body 101.

The first insulating wall 110 may be connected to the cover main body 101 using the hinge portion 105. The hinge portion 105 may allow the first insulating wall 110 to be coupled to the cover main body 101 in a rotatable manner such that the first insulating wall 110 may be foldable relative to the cover main body 101. The hinge portion 105 may allow free rotation relative to the cover main body 101 such that the bent portion of the bus bar 200 may be covered. For example, the end portion 220 of the bus bar 200 may be covered with the bus bar cover 100, and the first insulating wall 110 may be rotated to cover the bent portion of the bus bar 200 with the first insulating wall 110.

The bus bar cover 100 may insulate a portion of the bus bar 200 extending between the first and second insulating walls 110 and 120. For example, the first insulating wall 110 may cover the side of the bus bar 200, and the second insulating wall 120 may cover the other side of the bus bar 200. In this manner, the first and second insulating walls 110 and 120 may cover the side and the other side of the bus bar 200, that is, opposite sides of the bus bar 200.

Although the first insulating wall 110 is rotatably hinged to the cover main body 101, the second insulating wall 120 is fixed to the cover main body 101. For example, the second insulating wall 120 may be formed at a position relatively close to the hollow portion 150, and the first insulating wall 110 may be formed at a position relatively far from the hollow portion 150. For example, the first insulating wall 110 may be formed at a position relatively far from the hollow portion 150 to cover an outer side of the bus bar 200, and the second insulating wall 120 may be formed at a position relatively close to the hollow portion 150 to cover an inner side of the bus bar 200. In this case, since the first insulating wall 110 covering the outer side of the bus bar 200 is rotatable, the first insulating wall 110 may be brought into tight contact with the bus bar 200 by rotating the first insulating wall 110 in a direction not exposing the bus bar 200. For example, although the second insulating wall 120 is fixed, since the second insulating wall 120 covers the inner side of the bus bar 200 which is not exposed to the outside, the second insulating wall 120 may cover the inner side of the bus bar 200. Thus, although the second insulating wall 120 is not in tight contact with a corresponding portion of the bus bar 200, the second insulating wall 120 may provide a sufficient insulating effect.

Referring to FIGS. 8 and 9, latching protrusions 111 may be formed on the first insulating wall 110 to prevent the first insulating wall 110 from being separated from the bus bar 200. The latching protrusions 111 may protrude from the first insulating wall 110 toward the bus bar 200. The latching protrusions 111 is for maintaining the first insulating wall 110 in close contact with the bus bar 200 without being separated from the bus bar 200 and may be hooked to the bus bar 200. The latching protrusions 111 may be provided as a pair on both sides of the first insulating wall 110 such that the latching protrusions 111 may face each other with the bus bar 200 therebetween. The latching protrusions 111 may be bound to both ends of the bus bar 200 to prevent separation from the bus bar 200. For example, ends of the latching protrusions 111 may have a wedge shape.

The end portion 220 of the bus bar 200 may be covered with the bus bar cover 100 by slidably fitting the bus bar cover 100 around the end portion 220 of the bus bar 200. The bus bar cover 200 may include an assembly guide 121 to guide sliding of the bus bar cover 200 to an assembling position. For example, the assembly guide 121 may include an assembly hole 121' to insert the bus bar 200 into the assembly hole 121'. The assembly hole 121' may be formed in a substantially rectangular shape like the cross-sectional shape of the bus bar 200. For example, a wall defining the assembly hole 121' may include a pair of long sides and a pair of short sides. The bus bar 200 may be inserted into the assembly hole 121' by sliding of the bus bar cover 100 to an assembling position along the bus bar 200.

An assembly protrusion 121a may be formed on the assembly guide 121 to fix the position of the assembly guide 121. For example, the assembly protrusion 121a may protrude from the wall of the assembly hole 121' and may press the bus bar 200 up to a given pressure such that the bus bar 200 and the bus bar cover 100 may not be separated. A plurality of assembly protrusions 121a may be formed along the wall defining the assembly hole 121'. For example, if the wall of the assembly hole 121' has a pair of long sides and a pair of short sides, a plurality of assembly protrusions 121a may be formed along the long sides.

The assembly protrusion 121a may be formed on the cover main body 101 to fix the position of the cover main body 101. In addition, owing to the latching protrusions 111 formed on the first insulating wall 110 connected to the cover main body 101 through the hinge portion 105, separation of the first insulating wall 110 from the bus bar 200 may be prevented, and the first insulating wall 110 may be maintained in position while making tight contact with the bus bar 200. As described above, the bus bar cover 100 may be maintained in position using the assembly protrusion 121a of the cover main body 101 and the latching protrusions 111 of the first insulating wall 110.

The second insulating wall 120 is fixed to the cover main body 101. That is, unlike the first insulating wall 110, the second insulating wall 120 may not be rotatably connected to the cover main body 101, but may be fixed to the cover main body 101. For example, the second insulating wall 120 may be formed below the assembly guide 121. The assembly guide 121 may protrude downward to surround a lower surface of the bus bar 200, and the second insulating wall 120 may protrude from the assembly guide 121. The second insulating wall 120 may protrude downward from the assembly guide 121 and may insulate a portion of the bus bar 200. For example, the second insulating wall 120 may be bent from the cover main body 101 in a direction substantially perpendicular to the cover main body 101, and although the second insulating wall 120 is not maintained in tight contact with the bus bar 200, the second insulating wall 120 may prevent exposure of the bus bar 200 at a position adjacent to the bus bar 200.

The bus bar cover 100 may be formed in one piece. The bus bar cover 100 may be formed of an insulating material as a one-piece part. Here, the term "one piece" may mean that all the portions of the bus bar cover 100 are connected in a seamless manner or the entirety of the bus bar cover 100 is formed through a single process instead of forming the bus bar cover 100 by joining two or more parts formed through separate processes to each other.

While embodiments of the present disclosure have been described with reference to the accompanying drawings, the embodiments are for illustrative purposes only, and it will be understood by those of ordinary skill in the art that various modifications and equivalent other embodiments may be made therefrom. Therefore, the scope and spirit of the present disclosure should be defined by the following claims.

INDUSTRIAL APPLICABILITY

The present disclosure may be applied to batteries, that is, rechargeable energy sources, and various devices using batteries as power supplies.

The invention claimed is:

1. A battery module comprising:
a plurality of battery packs;
a bus bar defining a coupling hole for receiving a fastening member therethrough for electrically connecting neighboring battery packs to each other; and
a bus bar cover covering an end portion of the bus bar for insulating the bus bar, the bus bar cover comprising:
a cover main body defining a hollow portion through which the coupling hole of the bus bar is exposed, the hollow portion defining a hole above the coupling hole, aligned with the coupling hole, extending from the coupling hole in a direction away from the bus bar to above the bus bar, and having a width, and a height that is greater than the width; and
first and second insulating walls extending from the cover main body adjacent the hollow portion along a length of the bus bar, wherein the first insulation wall faces one surface of the bus bar, and is rotatably coupled to the cover main body by hinge axes crossing the length of the bus bar, and
wherein the second insulation wall faces another surface of the bus bar, and is fixedly coupled to the cover main body.

2. The battery module of claim 1, wherein the hollow portion has a cylindrical shape extending while surrounding the coupling hole.

3. The battery module of claim 1, wherein a hinge portion is placed between the first insulating wall and the cover main body to support rotation of the first insulating wall.

4. The battery module of claim 1, wherein a latching protrusion is provided on the first insulating wall to contact and latch onto the end portion of the bus bar, and to prevent separation of the first insulating wall from the bus bar.

5. The battery module of claim 4, wherein the latching protrusion comprises a pair of latching portions provided at both widthwise ends of the first insulating wall.

6. The battery module of claim 1, wherein the second insulating wall is fixed to the cover main body.

7. The battery module of claim 1, wherein the second insulating wall extends from the cover main body in a downward direction opposite the hollow portion.

8. The battery module of claim 1, wherein the first insulating wall is provided at a position relatively far from the hollow portion and covers an outer side of the bus bar, and
the second insulating wall is provided at a position relatively close to the hollow portion and covers an inner side of the bus bar.

9. The battery module of claim 1, wherein the bus bar cover comprises bus bar covers covering both end portions of the bus bar, and an insulating material is provided on a central portion of the bus bar except for both the end portions of the bus bar.

10. The battery module of claim 1, wherein the bus bar cover further comprises an assembly guide for guidance to an assembling position of the bus bar cover with respect to the bus bar.

11. The battery module of claim 10, wherein the assembly guide comprises an assembly hole to insert the bus bar into the assembly hole.

12. The battery module of claim 11, wherein the assembly guide further comprises an assembly protrusion to fix the assembling position of the bus bar cover with respect to the bus bar.

13. The battery module of claim 12, wherein the assembly protrusion protrudes from a wall defining the assembly hole.

14. The battery module of claim 10, wherein the second insulating wall protrudes downward from the assembly guide.

15. The battery module of claim 1, wherein the bus bar cover is provided using an insulating material as a one-piece part.

16. The battery module of claim 1, wherein the bus bar cover further comprises a barrier wall portion neighboring the hollow portion and surrounding an opening through which a portion of the bus bar is exposed, the barrier wall portion extending in a direction away from the bus bar.

17. A battery module comprising:
a plurality of battery packs;
a bus bar defining a coupling hole for receiving a fastening member therethrough for electrically connecting neighboring battery packs to each other;
a bus bar cover covering an end portion of the bus bar for insulating the bus bar, the bus bar cover comprising:
a cover main body defining a hollow portion through which the coupling hole of the bus bar is exposed, the hollow portion extending in a long shape from the coupling hole and in a direction away from the bus bar to a given height above the bus bar;
first and second insulating walls extending from the cover main body adjacent the hollow portion along a length of the bus bar, wherein the first insulation wall faces one surface of the bus bar, and is rotatably coupled to the cover main body by hinge axes crossing the length of the bus bar; and
a latching protrusion on the first insulating wall to prevent separation of the first insulating wall from the bus bar by being configured to directly contact and latch onto the bus bar by rotating the first insulating wall to the bus bar cover,
wherein the second insulation wall faces another surface of the bus bar, and is fixedly coupled to the cover main body,
wherein the end portion of the bus bar is covered with the bus bar cover, and
wherein the first insulating wall is rotated to cover a bent portion of the bus bar.

\* \* \* \* \*